US012547746B2

(12) United States Patent
Noronha et al.

(10) Patent No.: US 12,547,746 B2
(45) Date of Patent: Feb. 10, 2026

(54) SECURE DATA STORAGE AND FORWARDING SERVER

(71) Applicant: Stripe, Inc., South San Francisco, CA (US)

(72) Inventors: Venil Loyd Noronha, San Jose, CA (US); Angel Samsuddin Maredia, New Rochelle, NY (US); Tushar Dhoot, Seattle, WA (US); Bryan Berg, Seattle, WA (US); Daniel James Cobb, Sheboygan, WI (US); Joyce Zhang, Thousand Oaks, CA (US); Matthew Jeffryes, Moscow, ID (US); Ben Dong, Oakland, CA (US); Frank Yu, Seattle, WA (US)

(73) Assignee: Stripe, Inc., South San Francisco, CA (US)

( * ) Notice: Subject to any disclaimer, the term of this patent is extended or adjusted under 35 U.S.C. 154(b) by 53 days.

(21) Appl. No.: 18/751,920

(22) Filed: Jun. 24, 2024

(65) Prior Publication Data

US 2025/0390592 A1    Dec. 25, 2025

(51) Int. Cl.
*G06F 21/60*     (2013.01)

(52) U.S. Cl.
CPC .................. *G06F 21/606* (2013.01)

(58) Field of Classification Search
CPC ........ G06F 21/606; G06F 21/31; G06F 21/32; G06F 21/62; G06F 16/903; G06F 16/951; G06F 16/958
See application file for complete search history.

(56) References Cited

U.S. PATENT DOCUMENTS

| 10,360,543 | B2 * | 7/2019 | McCartney | ........ G06Q 30/0631 |
| 11,233,772 | B1 * | 1/2022 | Dinan | ................. G06F 21/6245 |
| 2010/0198730 | A1 * | 8/2010 | Ahmed | .................... G06F 21/30 380/278 |
| 2013/0042115 | A1 * | 2/2013 | Sweet | ................... G06F 21/577 713/176 |

(Continued)

OTHER PUBLICATIONS

Jayakody, A., et al. "Efficient API Migration across Environments." (2017). (Year: 2017).*

(Continued)

*Primary Examiner* — Jung W Kim
*Assistant Examiner* — Sameera Wickramasuriya
(74) *Attorney, Agent, or Firm* — Finnegan, Henderson, Farabow, Garrett & Dunner, LLP

(57) ABSTRACT

A server computer system is configured to forward secure data. The system stores secure data in a database. Each unit of secure data for which the system supports forwarding is associated with a respective token. The system receives from a first server, a request comprising at least: an indicator associated with a secure data, a destination indicator, a first API key, a second API key, and a body having a predefined data format. The system validates the request based on the first API key, references the database to obtain the secure data based on the indicator and the respective token, and populates the body with the secure data. Once populated, the system transmits a second request comprising the second API key and the populated body to a second server, based on the destination indicator.

20 Claims, 5 Drawing Sheets

(56) References Cited

U.S. PATENT DOCUMENTS

| | | | |
|---|---|---|---|
| 2014/0282968 A1* | 9/2014 | Aboughanaima | H04M 3/38 |
| | | | 726/7 |
| 2017/0257392 A1* | 9/2017 | Ghosh | H04L 63/1458 |
| 2019/0250859 A1* | 8/2019 | Greene | G06F 3/0685 |
| 2021/0281555 A1* | 9/2021 | He | H04L 63/0807 |
| 2021/0373860 A1* | 12/2021 | Khan | G06F 9/546 |
| 2021/0389854 A1* | 12/2021 | Rose | G06F 3/0482 |
| 2022/0067024 A1* | 3/2022 | Pethe | G06F 16/2452 |
| 2022/0067193 A1* | 3/2022 | Singh | G06F 21/602 |
| 2022/0150068 A1* | 5/2022 | Streit | G06F 21/316 |
| 2022/0198059 A1* | 6/2022 | Hatcher | G06F 21/606 |
| 2024/0019269 A1* | 1/2024 | Kagan | H04L 67/55 |
| 2025/0023714 A1* | 1/2025 | Kumar | H04L 9/0819 |

OTHER PUBLICATIONS

Mathijssen, Max, Michiel Overeem, and Slinger Jansen. "Identification of practices and capabilities in API management: a systematic literature review." arXiv preprint arXiv:2006.10481 (2020). (Year: 2020).*

* cited by examiner

SECURE DATA STORAGE AND FORWARDING SERVER

BACKGROUND

Data processing systems may comprise one or more computing devices that are connected over a wired and/or wireless communication medium. This medium, the communication protocols used by the various computing devices, and intermediate devices, may be referred to as a computer network. A data processing systems may act as a server which determines, retains, and transmits data electronically over the computer network to a client. A server may have a variety of real-world application such as for commercial transaction processing servers, media access servers, customer relationship management servers, data management servers, medical servers, etc., as well as a combination of such servers.

Data processing systems may be connected over a computer network for transmitting and sharing information. Computing devices connected to a computer network may include mobile devices, machinery, industrial equipment, household equipment, medical equipment, home computers, web servers, file servers, and more. A computer network may include network-specific devices such as routers, switches, firewalls, and more. The network may include any combination of wired transmission channels (e.g., fiber optic or traditional wire cables) and wireless channels (e.g., electromagnetic transmissions over frequency).

Data processing systems may store and share secure data with each other. In some cases, it may be desirable for a server to manage secure data in a protected manner, and handle electronic requests to transmit secure data to other data processing systems, in a secure, extensible, and accessible manner.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
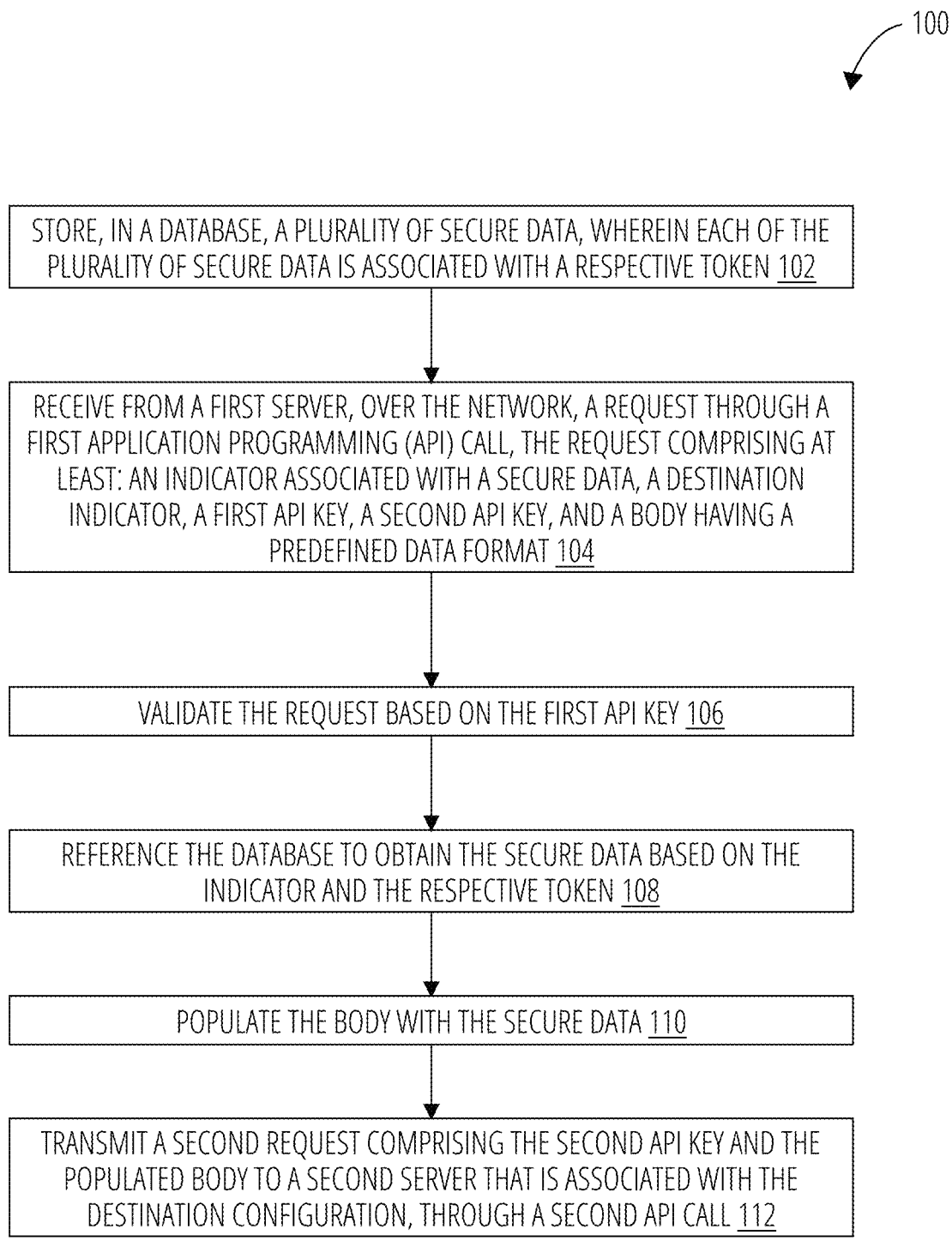
FIG. 1 shows an example method for storing and transmitting secure data, according to an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "processing", "storing", "detecting", "blocking", "completing", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Computing systems may deal with secure data that should be maintained securely. This secure data should be inaccessible to the public, and require authentication to access. Computing systems may communicate with each other over a computer network to exchange electronic data. In some cases, it is desirable for a network connected system (e.g., a web-based platform) to manage secure data from a centralized location on a network. Other computer servers may interact with this centralized system to request that the centralized system send the secure data to a second computer server for processing. The second computer server may use this secure data to perform an action or to update its own database of secure data with.

Traditional data processing systems may lack the security measures and architecture to efficiently manage secure data in a centralized location, and send this secure data to different sources over the computer network upon request. Traditional systems may not implement authorization of requests at both the ingoing and outgoing end of a secure data forwarding action. In addition, traditional systems may not perform such an act in a secure manner that reduces the amount of secure data that is transmitted over the network. In addition, traditional data processing systems may lack a computer architecture that limits its own exposure to secure data in an extensible manner. Aspects of a data processing system are described that improve upon traditional data processing systems.

In an aspect of the present disclosure, a data processing system is configured to store secure data. The secure data may be stored and organized in a database. For each secure data, the system may generate a unique digital token (e.g., a string of symbols) such as a hash, based on applying a hashing algorithm to the secure data. The system may store a mapping of the respective token to each secure data. The system may provide an indicator of this token to a first server. The mapping of the indicator to each respective token may also be stored by the system. The indicator may be a unique string of symbols such as a universally unique identifier (UUID) or globally unique identifier (GUID) or other string of symbols that the first server may use to identify the secure data.

The system may subsequently receive a request from the first server. The request includes the indicator associated with the respective token (but not the token itself), a first application programming interface (API) key, a second API key, a destination indicator, and a request body in a predefined format. This request body may include a plurality of pre-defined fields in a pre-defined order, at least one of which may be pre-filled by the first server, and at least one of which may be left empty by the first server which are to be filled by the data processing system.

The system validates the request with the first API key. If not validated, the request is ignored. Once validated, the system may retrieve the corresponding secure data with the indicator of the token and the token. For example, the system may reference a database with the indicator of the token to obtain the token, and reference a second database with the obtained token to obtain the secure data. The system may populate the provided body with the secure data (and potentially other data).

The system may transmit a second request to a second server, with the second API key and the populated body. The second request may be transmitted to a destination endpoint (e.g., a uniform resource locator (URL)) associated with the destination indicator. The system includes the second API key in the second request which is used by the second server upon receipt to validate this forwarded data.

In such a manner, the requestor need not manage secure data nor send secure data to each of the sources, and can request forwarding of the secure data with a non-secure identifier which reduces transmission of secure data over potentially unsecure channels. Additionally, by requiring that the first server provides two API keys, the system may validate the request using the first API key, and initiate validation of the second request using the second API key. By performing authentication using these two API keys, the system increases security on receiving the request and transmitting the secure data associated with the request.

In an embodiment, the system may comprise a dual computing architecture with a first one or more services dedicated to handling the secure data and forwarding API key (and other potentially sensitive forwarding information), and a second one or more services of the system that are isolated from the secure data. Such an architecture improves maintainability and updateability of the system, portions of the system may be maintained, tested, or updated without affecting portions of the system that interact with the secure data.

In an aspect, a data processing system is coupled to a computer network. The data processing system includes one or more processors coupled to memory that stores instructions that, when executed by the one or more processors, cause the data processing system to perform the following operations: storing, in a database, a plurality of secure data, where each of the plurality of secure data is associated with a respective token, receiving from a first server, over the network, a request through a first application programming (API) call, the request includes at least: an indicator associated with a secure data, a destination indicator, a first API key, a second API key, and a body having a predefined data format, validating the request based on the first API key, referencing the database to obtain the secure data based on the indicator and the respective token, populating the body with the secure data, and transmitting, over the network, a second request includes the second API key and the populated body to a second server that is associated with the destination indicator, through a second API call. In such a manner, the system securitizes forwarding of secure data so that the request need not include the secure data, and the system validates the request and the forwarding of the secure data using separate API keys.

In an embodiment, a first one or more services receives the request, validates the request with the first API key, encrypts the second API key, and provides a resulting partially encrypted request to a second one or more services. In an embodiment, a second one or more services references the respective token with the indicator, stores metadata associated with the partially encrypted request, and provides the respective token to the first one or more services. In an embodiment, the first one or more services references the secure data with the respective token received from the second one or more services, populates the body with the secure data, and transmits the second request according to a uniform resources locator (URL) mapped to the destination indicator. In such a manner, the system may reduce exposure to secure data—the first one or more services may be exposed to the second API key, as well as the secure data, while the second one or more services manages unsecure data. These services may be independently buildable and deployable, so that unsecure portions of the system may be updated without affecting secure portions, and vice versa.

In an embodiment, the system further performs storing, in a second database, metadata associated with the request, the metadata lacking the secure data and the second API key. The secure data, the second API key, and other potentially sensitive data may be stored as encrypted in the metadata or otherwise omitted entirely from the metadata.

In an embodiment, the request further includes an idempotency key, and transmitting the second request includes transmitting the idempotency key in the second request (e.g., in a header of the second request). The idempotency key is a unique key that identifies redundant requests to the destination server, so that redundant or repeat requests are ignored by the second server.

In an embodiment, the second server is associated with a secure vault, and the second request is transmitted to the second server to update the secure vault with the secure data in accordance with the body of the second request. In an embodiment, the second server is associated with a third party server, and the second request is transmitted to the second server for the third party to perform an action with the secure data and other populated fields in the body of the second request. In the former scenario, the first server may initiate the request with the system to update its own secure vault server. In the latter scenario, the first server may initiate the request to forward secure data to the third party server so that the third party server may perform an action with the secure data (e.g., a secure command to control machinery or operational technology, a web-based transaction, etc.).

In an embodiment, the second API call is performed as a hypertext transfer protocol (HTTP) post message in accordance with the destination indicator. In an embodiment, the predefined data format includes a JavaScript Object Notation (JSON) data format with one or more populated fields and one or more unpopulated fields.

Other technical features may be readily apparent to one skilled in the art from the following figures, descriptions, and claims.

FIG. 1 shows a flow diagram of a method 100 for storing and transmitting secure data, according to an embodiment. The method 100 may be performed by processing logic that may comprise hardware (circuitry, dedicated logic, etc.), software (such as is run on a general purpose computer system or a dedicated machine), firmware, or a combination. Processing logic may comprise a plurality of processors operating in a distributed computing architecture (e.g., a plurality of services that may be distributed over different servers on a computer network). Each service may be a self-contained buildable and deployable set of machine-executable instructions with dedicated computer resources such as processors, processor bandwidth, network transceiver resources, computer memory, etc. method 100 may be performed by a data processing system as described in other figures. In an embodiment, method 100 may be performed by a forwarding server as described with respect to other figures.

At block 102, processing logic stores, in a database, a plurality of secure data, wherein each of the plurality of secure data is associated with a respective token. For example, processing logic may store secure data in its database—secure_data_A—which may comprise digital data previously created by a client for forwarding. Secure data may include digital data that is to be protected. For example, secure data may include personal information, health data, encryption keys, payment information (e.g., credit card data, bank account information, etc.), digitized media, a command to equipment, a password, etc. In an example, processing logic displays a graphical user interface to client (e.g., a first server) or exposes an API to the client, to allow the client to input secure data. Processing logic may first validate the client using one or more credentials provided by the client, and then store the secure data provided by the client upon validation. Processing logic generates the respective token which is mapped to the secure data, such as by applying a hashing algorithm to the secure data, or by using a random number generator, to generate the respective token. Processing logic generates an identifier associated with that respective token and returns this identifier to the client to use in subsequent requests, such as at block 104. In such a manner, the client may create and secure data at a remote forwarding server, and receive an identifier for forwarding this secure data, where this identifier cannot be traced directly back to the secure data, and therefore cannot be used maliciously to decode the secure data. The token derived from the secure data may itself be kept securely by the forwarding server, without being passed over the network to the client.

At block 104, processing logic receives from a first server, over the network, a request through a first application programming (API) call, the request comprising at least: an indicator associated with a secure data (e.g., the indicator generated at block 102), a destination indicator, a first API key, a second API key, and a body having a predefined data format. For example, the client may send a request that includes (indicator_for_secure_data_a, MyDestination, API_key_one, API_key_two, and body (field X, field Y, field Z). This call may be received by a client to initiate forwarding of the secure data, either to perform an action with, or to store the secure data in a client's own vault, as described.

The indicator may be a human readable string, a randomly generated unique set of symbols (e.g., a UUID or GUID), or other indicator that obfuscates the underlying secure data and the respective token. For example, the call may comprise indicator indicator_for_secure_data_a that processing logic maps to a token (e.g., a hash of the secure data) and then maps to the actual secure data that is then forwarded to the indicated destination.

The destination indicator (MyDestination) may comprise a number, a string, or a network address (e.g., a URL). In an embodiment, the destination indicator may comprise a reference to a destination configuration which may correspond to a set of stored settings. Processing logic may refer to stored settings associated with the specified destination configuration to determine a network address to route the second request to, as well as other routing settings such as an HTTP message format (e.g., GET, POST, PUT, etc.).

The first API key and second API key may be a sequence of randomly generated numbers (e.g., a UUID or GUID). Other API key generation mechanisms may be used as well. Each API key may also be referred to as a bearer token. Processing logic may generate and provide the first API key to the requesting server at an earlier time, for example, through a graphical user interface (GUI) or exposed API. Processing logic may present a GUI with one or more displayed controls for a user to generate the first API key, upon providing digital credentials (e.g., a username and password). The second API key may be obtained by the first server separately (e.g., upon furnishing credentials to the destination endpoint). In such a manner, access to forwarding of secure data is protected by authentication of multiple API keys.

The body has a pre-defined format that is constructed by the first server. This format may include one or more fields in a specified order. In an embodiment, at least one of the fields is filled with parameters and/or instructions that are meant to be forwarded to the destination, and at least one of the fields is unfilled and meant to be filled with the secure data by processing logic. The pre-defined format is kept and transmitted by processing logic in the second request, with the unfilled field being populated. In such a manner, processing logic provides the first server with flexibility and control over how to format the second message that is sent to the destination, while safe keeping of the secure data.

At block 106, processing logic validates the request based on the first API key. In an aspect, the first API key is included in an authorization header of the request received from the first server. Processing logic may check whether the API key was previously granted to the requestor and if so, may deem the request to be valid. For example, processing logic may confirm whether API_key_one was previously granted to the requestor by referencing a list, database, a stored variable, or other dedicated memory. Other authentication algorithms may be used by processing logic to validate the first API key.

At block 108, processing logic references the database to obtain the secure data based on the indicator (e.g., indicator_for_secure_data_a) and the respective token. For example, processing logic may use the indicator to reference a first database that stores the respective token to obtain the respective token, and use the respective token to reference the secure data from a second database. The first and second database may be separate databases managed by different compute resources of processing logic. For example, processing logic may comprise a first one or more services that manages the first database but is isolated from the second database. Processing logic may comprise a second one or more services that manages the second database but is isolated from the first database. Such an architecture may improve extensibility and security of the secure data—components not dealing directly with secure data may be updated with reduced scrutiny and the risk of leaking secure data is reduced.

At block 110, processing logic populates the body with the secure data. As described, the data format of the body (e.g., the fields and their respective order) may be maintained. Processing logic may parse the fields with a parsing engine to determine which field or fields to populate with the secure data. In some examples, some of the fields may be pre-populated with non-secure data. Processing logic may populate one or more of the remaining fields with the secure data. For example, processing logic may populate the field X with secure_data, and leave field Y and field Z with pre-filled data originally provided by the client in the request. In an example, if the request is associated with a transaction, processing logic may find one or more payment fields and populate these fields with secure data (e.g., credit card or bank card information). In some embodiments, the body comprises a JavaScript Object Notation (JSON) format, however, other formats such as Extensible Markup Language (XML) can also be used. In such a manner, the client may specify exact formatting of the forwarded message, including which fields are to be included and the order of each field, while also omitting sending of secure data in the forwarding request, thereby improving security of the forwarding process.

At block 112, processing logic transmits a second request comprising the second API key (e.g., API_key_two) and the populated body to a second server that is associated with the destination configuration, through a second API call. In an example, processing logic may perform a lookup to settings that correspond to the destination configuration. These settings may indicate a network address (e.g., a URL, IP address, or other network address) to send the second request to. Additionally, the settings may indicate which type of HTTP message format to use. For example, MyDestination may be mapped to settings comprising IP_Address_123 and HTTP_POST method. In such a case, the second request may comprise: API_key_two, a body comprising secure_data_a in field X, and prefilled data in field Y and field Z, and destination information comprising IP_Address_123, sent as an HTTP POST message. This second API call is sent to the intended recipient (the second server) of the secure data, as dictated by the client. In this manner, the client is required to provide two API keys, the first to authenticate forwarding of secure data to the intended recipient (the second server) and the second to be authenticated at the second server to act upon the secure data. In response to authenticating the second API key, the second server may perform an action with the secure data, or update a second token vault managed by the second server.

In an embodiment, the second API call may be performed using an HTTP POST message. In an example, the second API key may be included in a header (e.g., in an authentication header) of the second API call. In an embodiment, the received request and transmitted second request, are performed over Hypertext Transfer Protocol (HTTP) or secure HTTP (HTTPS).

The receiving server may validate the second request using the second API key, and perform one or more actions in response to the validation. In a first scenario, method 100 may be initiated by a requesting server to forward the secure data to a third party server to perform an action, as described further in FIG. 2. In a second scenario, method 100 may be initiated by the requesting server to update an external token vault (external to the forwarding data processing system), as described further in FIG. 3. In either scenario, as described, transmission of secure data over the computer network is reduced, while validation is enforced at two separate API endpoints.

Figure 2:
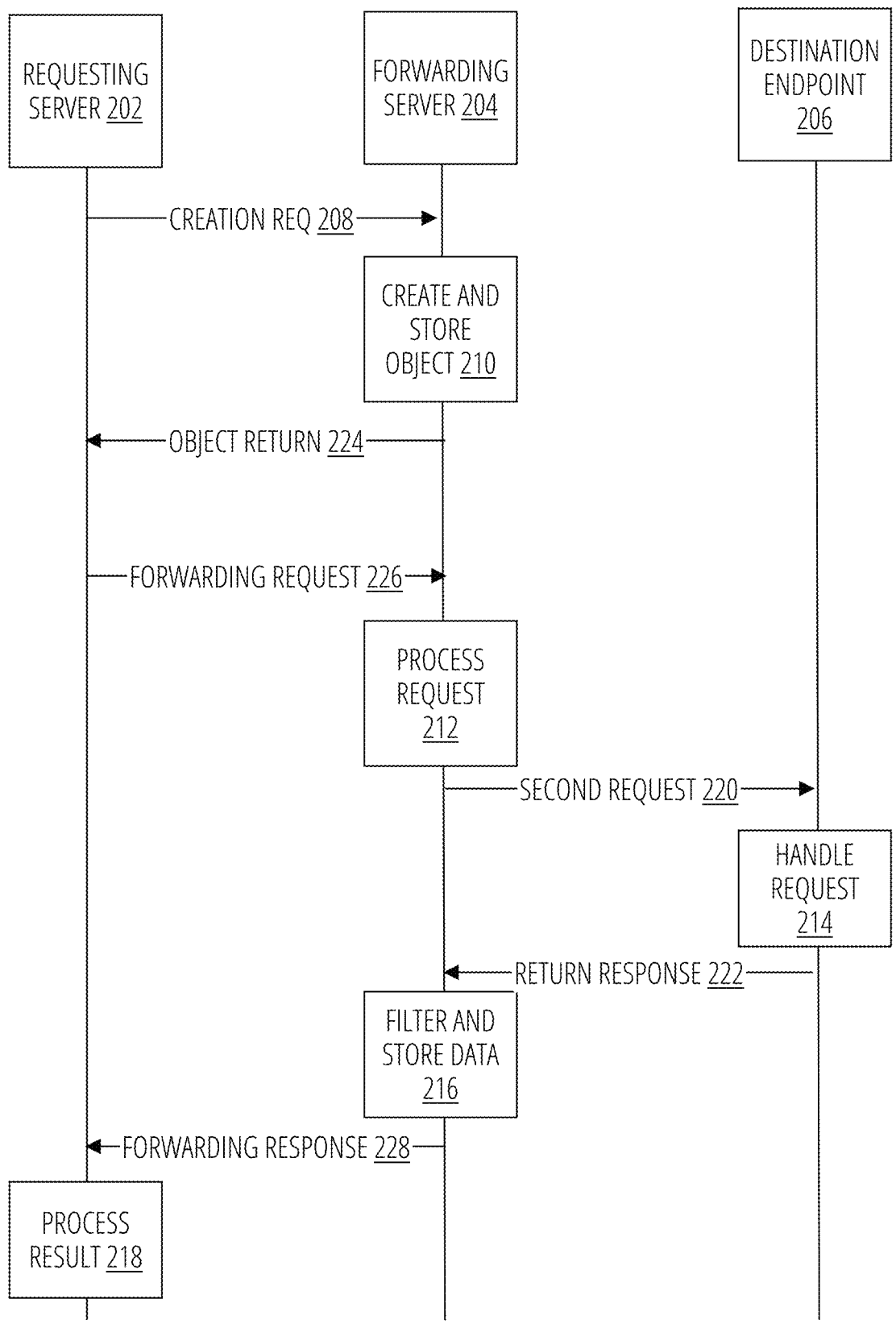
FIG. 2 shows a sequence diagram of a forwarding server that handles a request to transmit secure data to a second server to perform an electronic action, in accordance with an embodiment.

FIG. 2 shows a sequence diagram of a forwarding server 204 that handles a request to transmit secure data to a second server to perform an electronic action, in accordance with an embodiment. A client (e.g., requesting server 202) may communicate with forwarding server 204 to create secure data, and then forward it to an intended recipient (endpoint 206) for the intended recipient to perform an action with the secure data.

Requesting server 202, forwarding server 204, and destination endpoint 206 may be communicatively coupled over a computer network (not shown). A computer network may comprise wired or wireless transmitters, receivers, network switches, routers, firewalls, cables, etc. The computer network may include a wide area network (WAN), a local area network (LAN), and/or the public internet. Computing devices (e.g., 202, 204, 206) may communicate with each other over the computer network using one or more communication protocols such as, for example, transmission control protocol/internet protocol (TCP/IP). Requesting server 202 may correspond to first server as described with respect to FIG. 1. Destination endpoint 206 may correspond to a second server as described with respect to FIG. 1.

At operation 208, requesting server 202 may transmit a creation request to forwarding server 204 to create a new object (e.g., a digital container for data). The creation request may include secure data that is to be stored in the new object. In an example, the creation request may include a request to create a forwardable digitized set of data (e.g., secure set of data A, secure set of data B, etc.) that is to be kept and managed by forwarding server 204 and forwarded upon request.

In response to this request, at operation 210, forwarding server 204 may validate this request such as by verifying all required fields are provided in the creation request and that these required fields satisfy respective rules. Forwarding server may validate credentials of requesting server 202 and reject the creating request if the credentials fail validation. In some embodiments, forwarding server may set one or more digital timers with respect to created secure data, and the secure data may be expired once the corresponding digital timer expires. In such a case, if a later forwarding request (e.g., 226) is made in association with expired secure data, forwarding server 204 may reject such a request. At operation 210, forwarding server 204 may tokenize the secure data such as by generating a token (e.g., a hash) that corresponds to the secure data, and storing the secure data in a database.

In an embodiment, the forwarding server 204 may comprise a secure vault in which the secure data is stored. The secure vault may comprise one or more of: a firewall that protect the data, password protection to access the data, encryption of the secure data, restricted access, restricted physical access, monitored and logged access, or be subject to routine tests. In an embodiment, the secure data may be kept by the forwarding server in a payment card industry (PCI) compliant data vault. Forwarding server 204 may generate the indicator associated with the secure data, as a unique string of symbols (e.g., numbers and/or characters). Forwarding server 204 stores a mapping of the token to the secure data, and a second mapping of the indicator to the token. For example, the indicator may indicate secure data A, or secure data B, or some other indicator corresponding to and uniquely identifying the secure data.

At operation 224, forwarding server 204 returns the indicator to the requesting server 202. The return may omit any secure data and/or direct token of the secure data. Requesting server 202 may keep this indicator locally which it may use to subsequently forward this stored secure data to other parties from the forwarding server 204. In this manner, network traffic does not needlessly include the secure data or corresponding token, thus reducing the risk of security breach.

At operation 226, forwarding server 204 receives a request through a first API call. The first API call may comprise a Hypertext Transfer Protocol (HTTP) message or Hypertext Transfer Protocol Secure (HTTPS) message. The request may include at least: an indicator associated with a secure data, a destination indicator, a first API key, a second API key, and a body having a predefined data format. The body may be partially populated with parameters and/or instructions which are to be forwarded to the destination endpoint 206. As discussed, the received indicator may be generated by forwarding server 204 and provided to the requesting server 202 upon creating successful creation of a data object. In some examples, a creation request may comprise multiple secure data, each of which may be separately indicated and forwarded by using the corresponding indicator. For example, if operations 208 and 210 involve multiple secure data associated with a data object, multiple corresponding indicators may be provided at operation 224. At operation 226, requesting server 202 may select which secure data is to be forwarded, and include that indicator in the request.

At operation 212, forwarding server 204 may validate the received request based on the first API key. As described in other sections, an API key is a string of symbols forming a unique identifier, which forwarding server 204 may use to identify traffic from API clients such as requesting server 202, and authenticate such requests. The first API key may comprise a string of symbols (e.g., numbers or characters) that are randomly generated by forwarding server 204, such as by using a random number generator. The API keys may be UUIDs or GUIDs. The forwarding server 204 may comprise a database of API keys previously provided to clients (e.g., to requesting server 202), and use this database to validate requests from those clients. If the received request comprises a first API key that matches one in the database, then the forwarding server 204 may validate this request and continue processing the forwarding request. Otherwise, the forwarding request may be ignored, thus blocking potential malicious attackers from accessing secure data.

At operation 212, once the request is validated, forwarding server 204 may reference a database using the indicator to obtain the token, then reference a second database with the token to obtain the secure data. The forwarding server 204 may populate the body with the secure data. The body may comprise one or more fields that include parameters and/or instructions that are populated by requesting server 202 in the forwarding request 226, as well as one or more blank fields that the forwarding server 204 fills with the secure data. Forwarding server 204 may construct a second request that includes the body of the first request (now populated), in accordance with the destination indicator. The destination indicator may comprise a network address or a configuration that forwarding server uses to reference the network address of the destination endpoint 206. This may add additional security so that network traffic does not contain a direct network address of the intended recipient of the secure data.

At operation 220, forwarding server 220 transmits a second request to the destination endpoint 206, through a second API call. This second API call is directed at the network address (e.g., a uniform resources locator (URL)) associated with the destination indicator. At operation 214, destination endpoint 206 may parse the second request and perform one or more actions, in accordance with the secure data, the parameters, and/or instructions of the populated body. Destination endpoint 206 may be an API endpoint that handles messages received at the network address. In an embodiment, destination endpoint 206 may be a separate computing device from requesting server 202 and forwarding server 304.

In an embodiment, the request from requesting server 202 includes an idempotency key. In such a case, forwarding server 204 includes this idempotency key in the second request that is transmitted at operation 220 to destination endpoint 206. Destination endpoint 206 may use this idempotency key to determine whether a previous request was used with the same idempotency key. If yes, destination endpoint 206 may ignore the second request and take no action. With such a forwarding feature, the client and forwarding system may work together to prevent redundant processing of duplicate second requests.

In an example, destination endpoint 206 is configured to perform a payment transaction. The secure data in the second request may include secure payment details such as name, credit card number, a bank account number, bank routing information, expiration date, a card verification code, a person's address, or other payment information used to perform the payment transaction. The indication provided back to the client may indicate a particular payment method (e.g., credit card A, credit card B, checking account A, etc.). The parameters provided in the initial request and forwarded through the second request may comprise a transaction amount, shipping details, parties of the transaction, goods to be transacted, or other information. Instructions may comprise settings used to perform the transaction. In other examples, destination endpoint 206 may comprise one or more computers configured to perform non-transaction based actions with the second request. For example, the secure data may comprise parameters used by destination endpoint 206 to drive and operate computing equipment, machinery, medical equipment, vehicles, defense systems, weather monitoring equipment, household appliances, etc.

The actions performed by destination endpoint 206 may vary depending on application.

At operation 222, destination endpoint 206 may report the results of the action back to forwarding server 204. For example, if the action was performed successfully, or if there was an error, these may be returned to forwarding server 204 (e.g., with a string or code).

At operation 216, forwarding server 204 may store metadata associated with the receiving of the request and transmission of the second request. In an embodiment, this metadata includes the parameters sent to the destination endpoint 206, when this second request was sent, and the result of the action received at operation 222. In an embodiment, the secure data, the second API key, an idempotency key (if included in the request), and/or other potentially sensitive data is omitted from or encrypted when storing as the metadata. In an embodiment, the forwarding server 204 stores the second request including its exact data format, and associated timestamps of reception and transmission of the request and second request, but with the secure and sensitive data removed or encrypted. In this manner, forwarding server 204 maintains a record of each forwarding request and result thereof, but without the secure data present in those records.

At operation 228, forwarding server 204 may send a forwarding response to requesting server 202 and provide results of the forwarding request (from operation 222) to requesting server 202. At operation 218, requesting server 202 may update its own databases and/or perform additional actions based on the received results of the forwarding requests.

Figure 3:
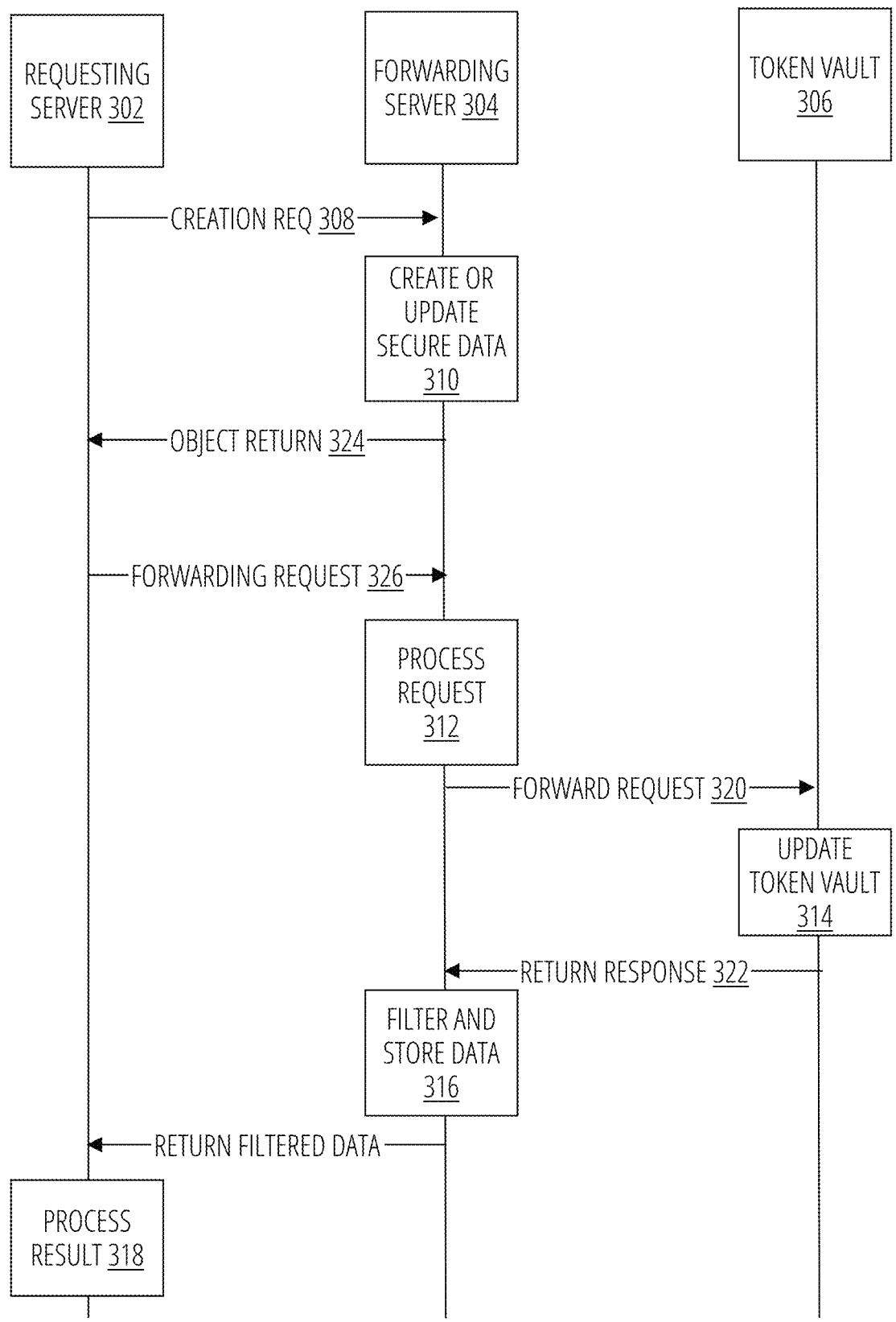
FIG. 3 shows a sequence diagram of a forwarding server that handles a request to transmit secure data for updating an external token vault, in accordance with an embodiment.

FIG. 3 shows a sequence diagram of a forwarding server that handles a request to transmit secure data for updating an external token vault, in accordance with an embodiment. Under the scenario illustrated in FIG. 3, requesting server 302 is using forwarding server 304 to update a separate token vault 306 which may be affiliated with requesting server 302. For example, some clients (e.g., requesting server 302) may operate their own token vault 306 to interact with other destination endpoints (e.g., 206). In such a case, the client can use the forwarding server 304 to update its own token vault, by directing the forwarding server 304 to forward the secure data to the token vault 306. For example, token vault 306 may have stored within it secure data A indicated by indicator_for_secure_data_a. The client may then update secure_data_A in forwarding server 304, and will want to also update its own token vault 306 to reflect this update.

Aspects shown in FIG. 3 may correspond to those shown in FIG. 2. For example, requesting server 302, forwarding server 304, and token vault 306 may be communicatively coupled over a computer network which may include a WAN, a LAN, and/or the public internet. At operation 308, and 310, secure data (e.g., secure_data_A_updated) is stored and managed by forwarding server 304, and an indicator (e.g., indicator_to_secure_data_a) is provided back to the requesting server 302 at operation 324. The requesting server 302 may subsequently use the received indicator to transmit a forwarding request at operation 326.

At operation 326, the requesting server 302 may generate a request and transmit this request to forwarding server 304. The request includes a first API key, a second API key, the indicator (e.g., indicator_to_secure_data_a) to reference the secure data, and a request body, as described in other sections.

At operation 312, the forwarding server 304 validates the request with the first API key. Upon validation, the forwarding server 304 retrieves the secure data as described and generates a second request.

At operation 320, forwarding server 304 transmits the second request populated with the secure data (e.g., secure_data_A_updated) and the received indicator (e.g., indicator_to_secure_data_a), the second API key, and other fields of the body, if provided in the initial request at operation 326.

At operation 314, token vault 306 receives the second request and validates this second request using the second API key. Upon validation, token vault 306 updates its own database (e.g., a PCI compliant vault) with the secure data. Token vault 306 may use the indicator (e.g., indicator_to_secure_data_a) to reference an existing version of the secure data (e.g., secure_data_A), and overwrite this existing secure data with the received payload (e.g., secure_data_A_updated) in the second request. Token vault 306 may maintain its own mapping of respective indicators to respective secure data in its vault. In some embodiments, the request from requesting server 302 includes an idempotency key. In such a case, forwarding server 304 includes this idempotency key in the second request that is transmitted at operation 320 to token vault 306. Token vault 306 may use this idempotency key to determine whether a previous request was used with the same idempotency key. If yes, token vault 306 may refrain from further action, to avoid redundant processing of the second request.

At operation 322, the token vault 306 may transmit a response with a result code (e.g., '1' indicating success, or '2' indicating failure) or other indication of operation 314. Forwarding server 304 may, at operation 316, filter out secure data and other sensitive information, and transmit this back to requesting server 302. At block 318, requesting server 302 may process the result, for example, it may log the result, or provide a notification to an administrator if the updated failed. In an embodiment, token vault 306 may be part of or integrated with requested server 302. For example, token vault 306 may be an API endpoint handled by requesting server 302. In another embodiment, token vault 306 and requesting server 302 be a separate computing devices with a separate network addresses.

It should be understood that FIG. 3 and FIG. 2 are not exclusive of each other. For example, a requesting server 202 or 302 may make a first request to forward secure data to a destination endpoint 206 to handle a request and perform an action with the secure data, and then make a second request to forward the same secure data or different secure data to update its own token vault 306. In some cases, token vault 306 may be operated and managed by a third party (e.g., not affiliated with requesting server 302 or forwarding server 304).

Figure 4:
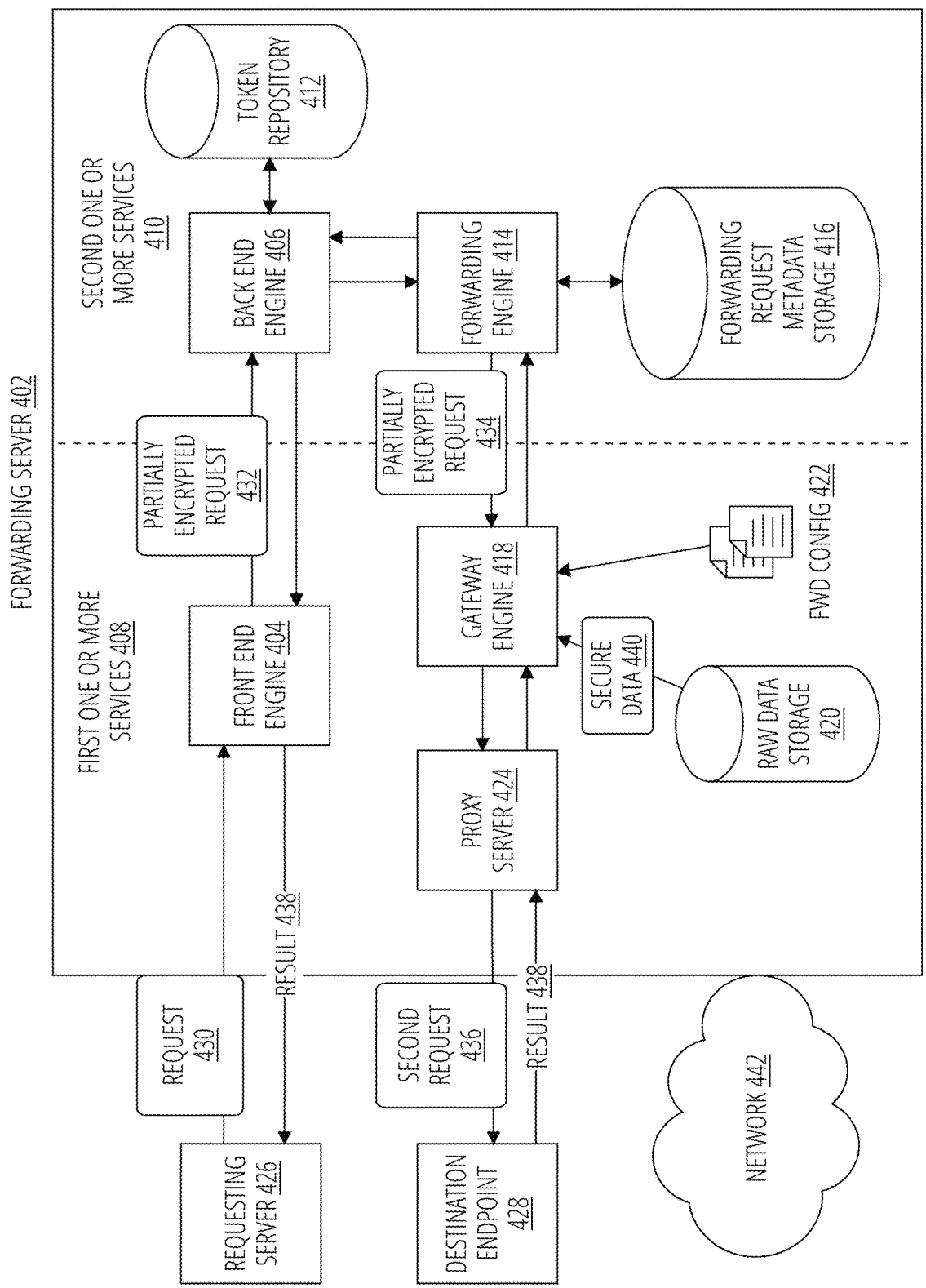
FIG. 4 shows an example of an architecture of a forwarding server comprising a plurality of services, in accordance with an embodiment.

FIG. 4 shows an example of an architecture of a forwarding server 402 comprising a plurality of services, in accordance with an embodiment. Such an architecture may divide the forwarding server 402 into a first portion that directly processes the secure data, and a second portion that is insulated from the secure data, which may maintain security of the secure data providing additional freedom to update components not directly processing the secure data.

Requesting server 426, forwarding server 402, and destination endpoint 428 may be connected over wired or wireless communication channels of a computer network 442. Network 442 may comprise transmitters, receivers, network switches, routers, firewalls, cables, etc. Network 442 may include a WAN, LAN, and/or the public internet.

The servers may communicate with each other over the network 442 using one or more communication protocols such as, for example, transmission control protocol/internet protocol (TCP/IP). Communication protocols may be layered, such that a single communication may utilize various different communication protocols. In some cases, the servers may communicate over a layer 7 protocol (e.g., HTTP, HTTPS, etc.).

Aspects described with respect to FIG. 4 may correspond to those described with respect to FIG. 1, FIG. 2, and FIG. 3. Additional architectural details are shown with respect to forwarding server 402 and data processing internal to forwarding server 402.

Forwarding server 402 may comprise a plurality of services. Each service or a group thereof may correspond to an engine or server such as front end engine 404, back end engine 406, forwarding engine 414, gateway engine 418, and proxy server 424. Each of the services may comprise independently buildable and deployable machine language instructions (e.g., software code) that may be associated with respective compute resources (e.g., memory, hardware, CPU bandwidth, etc.). In some embodiments, the plurality of services may be distributed over a single server. In another embodiment, the plurality of services may be distributed over one or more servers. In another embodiment, the plurality of services may be distributed over a plurality of servers. The plurality of services may comprise a first one or more services 408 and a second one or more services 410 which are communicatively coupled, as described below. The first one or more services 408 is directly exposed to and handles secure data as well as sensitive data such as the network address of the destination endpoint 428 and the API keys. The second one or more services 410 is isolated from this secure and sensitive data, and manages record keeping of each forwarding request, the result of the forwarding request, and managing relationship between the indicator and the token, as described further below.

Forwarding server 402 may transmit a request 430 to forwarding server 402. The first one or more services 408 may receive this request at front end engine 404. The request 430 may comprise at least a first API key, a second API key (which is different from the first API key), an identifier, a destination configuration, and a request body. For example, the request 430 may include: indicator_for_secure_data_a, MyDestination, API_key_one, API_key_two, and body (field X, field Y, field Z). The request body may have a specified format (e.g., a specified number and order of fields in specified language such as JSON, XML, etc). Some of the fields of the request body may be pre-filled by forwarding server 402 with parameters to be forwarded to the destination endpoint 428, while others may be left blank.

The front end engine 404 validates the request 430 with the first API key, and partially encrypts the request 430. In an example, front end engine 404 encrypts the second API key (e.g., API_key_two). Additionally, if an idempotency key is included in the request 430, front end engine 404 encrypts this as well. Additionally, the destination configuration (e.g., MyDestination) may also be encrypted. The rest of the information, including the indicator indicator_for_secure_data_a, is left unencrypted. This resulting partially encrypted request 432 including: indicator_for_secure_data_a, <encrypted>MyDestination, API_key_one, <encrypted>API_key_two, and body (field X, field Y, field Z), is passed to the second one or more services 410.

The back end engine 406 of the second one or more services 410 may extract the indicator (e.g., indicator_for_secure_data_a) from this partially encrypted request 432 and reference a corresponding token (e.g., token_a) in the token repository 412 using this indicator. This obtained token corresponds to the sought after secure data associated with the request 430. In an embodiment, this token may be a hash of the sought after secure data. Although the second one or more services 410 manages the token, the second one or more services 410 is isolated from the actual secure data, as well as the other potentially sensitive data described above.

At forwarding engine 414, metadata associated with the request 430 is generated and stored in forwarding request metadata storage 416. This metadata may comprise one or more of: a timestamp indicating when the request 430 is transmitted or received, an identifier or network address associated with the requesting server 426, the received indicator associated with the secure data, or encrypted secure and sensitive data. The forwarding engine 414 sends the partially encrypted request 434 (indicator_for_secure_data_a, encrypted <MyDestination>, API_key_one, encrypted <API_key_two>, and body (field X, field Y, field Z) with the token (token_a) obtained from token repository 412, to the gateway engine 418.

At the gateway engine 418, the partially encrypted request 434 is processed to generate second request 436. Gateway engine 418 may decrypt the encrypted portions of the partially encrypted request 434 using a decryption algorithm. For example, encryption and decryption within the forwarding server 402 may be performed via an encryption key pair. Once decrypted, gateway engine 418 performs a look up of the secure data 440 (e.g., secure_data_a) from raw data storage 420, using the token (e.g., token_a) obtained from token repository 412. Gateway engine 418 fills in one or more fields of the decrypted request with the secure data 440. As described, this may include filling one or more fields of the body with the secure data 440 or a portion of the secure data 440. For example, secure data 440 may comprise a plurality of values (e.g., name, number, etc.) and each of these values may populate a different field. Gateway engine may generate the second request 436 with a body in the same format (e.g., having the same set of fields in the same order) as request 430. The fields in request 430 that were filled may remain filled with the same data in second request 436. Second request may comprise a populated body with field X comprising a portion of secure data 440, field Y comprising a second portion of secure data 440, and field Z comprising previously filled in data received at request 430. The secure data 440 may comprise payment information (e.g., a credit card and associated user information, bank account information and associated user information), medical information, usernames or passwords, network addresses, mixed media, control commands, or other digital data that is to be protected and forwarded. Raw data storage 420 may be a PCI compliant vault. In an embodiment, the token repository 412 and raw data storage 420 are populated with secure data and respective token based on a creation request, as described with respect to FIG. 2 and FIG. 3. Gateway engine may pass this second request to the gateway engine 418 to formulate the destination.

At gateway engine 418, the destination configuration (MyDestination) received in request 430 may be mapped to specified settings stored in the forwarding configuration 422. Gateway engine 418 comprises processing logic that parses a destination configuration and maps the specified destination configuration (e.g., MyDestination) to a stored configuration in forwarding configuration 422 which is then used to construct the forwarding message. For example, a MyDestination may be mapped to a specified HTTP method (e.g., GET, POST, PUT, etc.), credentials associated with the requesting party, network connection settings (e.g., IP address, port, etc.), and/or one or more destination uniform resource locators (URLs). The gateway engine 418 may generate the second request 436 in accordance with these specified settings. For example, gateway engine 418 may generate the second request 436 to be directed to the network address specified by the destination configuration, using the specified HTTP method, and other settings as indicated. This second request 436 and specified settings are routed to proxy server 424 which comprises one or more services configured to interface with network 442. The proxy server 424 then transmits the second request 436 to the destination endpoint 428. The stored forwarding configuration 422 may comprise a hashed and/or separately encrypted version of the second API key, which is then matched by the first one or more services 408 against the incoming second API key, at runtime. This validation may be performed at various stages, for example, at block 106 when the first API key is validated, at operations 212, 312, or earlier or later. This validation serves as a security measure performed by the forwarding server 402, so that the secure data 440 being sent to the destination endpoint 428 is only made accessible to a corresponding specific account on the destination endpoint 428. For example, in an event where the first API key is inadvertently leaked on the requesting server's side, a malicious user simply cannot swap the second API key (for example, one that identifies their malicious account) with another key, and must use the same second API key that was agreed upon during configuration creation. Configuration creation may be performed by a requesting server via a credentialed session such as, for example, at operations 102, 210, 310, or in a separate session or through a dedicated API, in which case the second API key is agreed upon between the requesting server and the forwarding server, and the hashed and/or encrypted version of the second API key may be stored and mapped to an account associated with the requesting server. If the second API key is validated against the stored hash and/or encrypted version, it is forwarded along to the destination endpoint 428, however if not validated, the forwarding server 402 may ignore or reject request 430.

Destination endpoint 428 receives the second request 436 and validates it using the second API key. Once validated, destination endpoint 428 may either use the second request (with secure data) to perform an action or store this secure data in a local secure data repository, as described in other sections. For example, the destination endpoint 428 may be a server that processes a transaction between a merchant and consumer, and the secure data may comprise payment information for the destination endpoint 428 to perform the transaction. In another example, the destination endpoint 428 may manage its own secure vault, in which case the destination endpoint writes the forwarded secure data to its own secure vault to keep that secure vault updated and in sync with the forwarding server 402. If not validated, destination endpoint 428 may ignore the second request 436. Destination endpoint 428 may optionally send back a return result 438 with an indication of the action performed (e.g., a result code, values, or a string). Upon receipt, the proxy server 424 may route this result 438 to gateway engine 418 which forwards the result 438 to forwarding engine 414. Forwarding engine 414 updates the metadata associated with the corresponding second request 436. The result 438 is routed back to the front end engine 404 and transmitted back to the requesting server 426.

Each of the engines or proxy server may comprise one or more services or machine readable and executable instructions performed by one or more services, with delineation between functionality shown between the first one or more services 408 and second one or more services 410.

Figure 5:
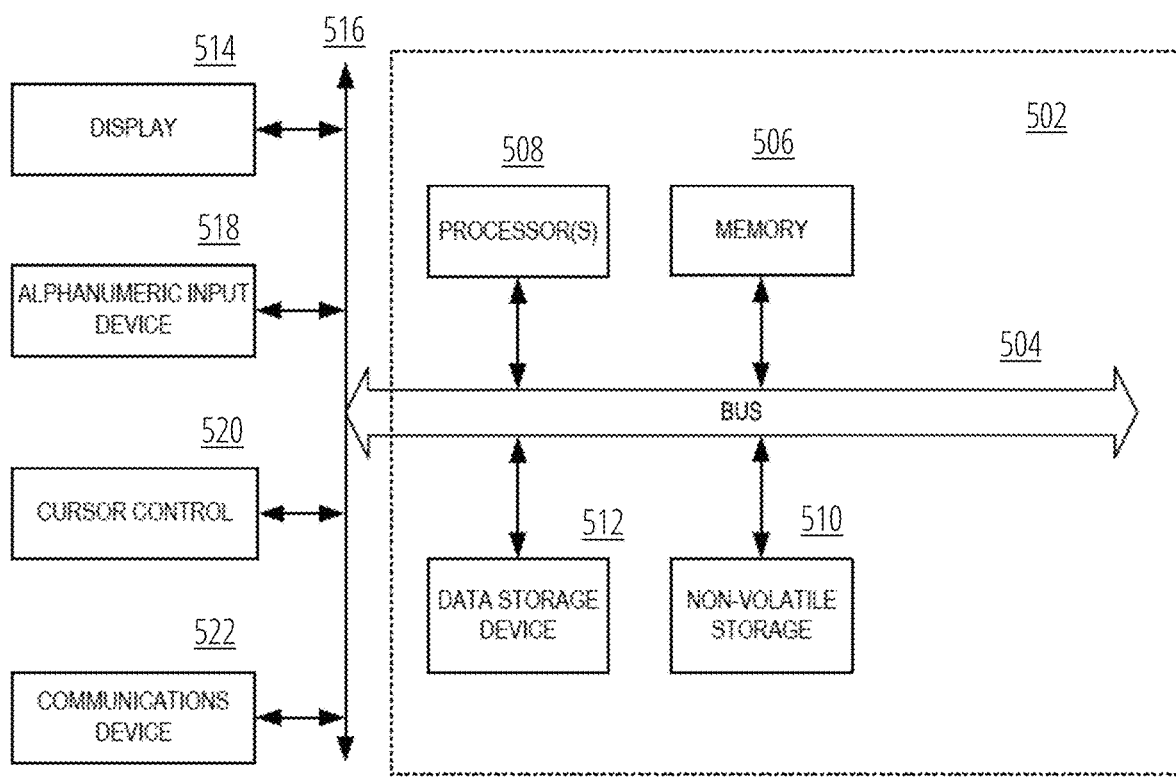
FIG. 5 is one embodiment of a computer system that may be used to support the systems and operations described, in accordance with an embodiment.

FIG. 5 is one embodiment of a computer system that may be used to support the systems and operations described, in accordance with an embodiment. For example, the computer system illustrated in FIG. 5 may be used by a forwarding server, a requesting server, a destination endpoint, etc. It will be apparent to those of ordinary skill in the art, however that other alternative systems of various system architectures may also be used.

The computer system 502 illustrated in FIG. 5 includes a bus or other internal communication means 504 for communicating information, and one or more processors 508 coupled to the bus 504 for processing information. The system further comprises a random access memory (RAM) or other volatile storage device 506 (referred to as memory), coupled to bus 504 for storing information and instructions to be executed by processor 508. Main memory 506 also may be used for storing temporary variables or other intermediate information during execution of instructions by processor 508. The system also comprises a read only memory (ROM), non-volatile storage, and/or static storage device 510 coupled to bus 504 for storing static information and instructions for processor 508, and a data storage device 512 such as a magnetic disk or optical disk and its corresponding disk drive. Data storage device 512 is coupled to bus 504 for storing information and instructions.

The system may further be coupled to a display device 514, such as a light emitting diode (LED) display, or a liquid crystal display (LCD) coupled to bus 504 through bus 516 for displaying information to a computer user. An alphanumeric input device 518, including alphanumeric and other keys, may also be coupled to bus 504 through bus 516 for communicating information and command selections to processor 508. An additional user input device is cursor control device 520, such as a touchpad, mouse, a trackball, stylus, or cursor direction keys coupled to bus 504 through bus 516 for communicating direction information and command selections to processor 508, and for controlling cursor movement on display device 514.

Another device, which may optionally be coupled to computer system 502, is a communication device 522 for accessing other nodes of a distributed system via a network. The communication device 522 may include any of a number of commercially available networking peripheral devices such as those used for coupling to an Ethernet, token ring, Internet, or wide area network. The communication device 522 may further be a null-modem connection, or any other mechanism that provides connectivity between the computer system 502 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 506, mass storage device 512, or other storage medium locally or remotely accessible to processor 508.

It will be apparent to those of ordinary skill in the art that the system, method, and process described herein can be implemented as software stored in main memory 506 or read only memory and executed by processor 508. This control logic or software may also be resident on an article of manufacture comprising a computer readable medium having computer readable program code embodied therein and being readable by the mass storage device 512 and for causing the processor 508 to operate in accordance with the methods and teachings herein.

The embodiments discussed herein may also be embodied in a handheld or portable device containing a subset of the computer hardware components described above. For example, the handheld device may be configured to contain only the bus 504, the processor 508, and memory 506 and/or 512. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 508, a data storage device 512, a bus 504, and memory 506, and only rudimentary communications mechanisms, such as a small touchscreen that permits the user to communicate in a basic manner with the device. In general, the more special purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method performed by a data processing system in communication with a network, comprising:
   storing, in a database, a plurality of secure data, wherein each of the plurality of secure data is associated with a respective token;
   receiving from a first server, over the network, a request through a first application programming (API) call, the request comprising at least: an indicator associated with a secure data, a destination indicator, a first API key, a second API key, and a body having a predefined data format;
   validating the request based on the first API key;
   referencing the database to obtain the secure data based on the indicator and the respective token;
   populating the body with the secure data; and
   transmitting, over the network, a second request comprising the second API key and the populated body to a second server that is associated with the destination indicator, through a second API call.

2. The method of claim 1, wherein a first one or more services of the data processing system
   receives the request,
   validates the request with the first API key,
   encrypts the second API key, and
   provides a resulting partially encrypted request to a second one or more services.

3. The method of claim 2, wherein the second one or more services of the data processing system
   references the respective token with the indicator,
   stores metadata associated with the partially encrypted request, and
   provides the respective token to the first one or more services.

4. The method of claim 3, wherein the first one or more services
   references the secure data with the respective token received from the second one or more services,
   validates the second API key,
   populates the body with the secure data, and
   transmits the second request according to a uniform resources locator (URL) mapped to the destination indicator.

5. The method of claim 1, wherein the second API call is performed as a hypertext transfer protocol (HTTP) message with an HTTP method type selected based on the destination indicator.

6. The method of claim 1, wherein the predefined data format comprises a JavaScript Object Notation (JSON) data format with one or more populated fields and one or more unpopulated fields.

7. The method of claim 1, further comprising: storing, in a second database, metadata associated with the request, the metadata omitting the secure data and the second API key.

8. The method of claim 1, wherein the request further comprises an idempotency key, and wherein transmitting the second request comprises populating the second request with the idempotency key.

9. The method of claim 1, wherein the second server is associated with a secure vault, and the second request is transmitted to the second server to update the secure vault with the secure data in accordance with the populated body of the second request.

10. The method of claim 1, wherein the second server is associated with a third party server, and the second request is transmitted to the second server for the third party to perform an action with the secure data and other populated fields in the body of the second request.

11. A server computer system comprising:
    a memory, and one or more processors coupled with the memory configured to perform operations, comprising:
    storing, in a database, a plurality of secure data, wherein each of the plurality of secure data is associated with a respective token;
    receiving from a first server, over a network, a request through a first application programming (API) call, the request comprising at least: an indicator associated with a secure data, a destination indicator, a first API key, a second API key, and a body having a predefined data format;
    validating the request based on the first API key;
    referencing the database to obtain the secure data based on the indicator and the respective token;

populating the body with the secure data; and transmitting, over the network, a second request comprising the second API key and the populated body to a second server that is associated with the destination indicator, through a second API call.

12. The server computer system of claim 11, wherein a first one or more services of the server computing system
receives the request,
validates the request with the first API key,
encrypts the second API key, and
provides a resulting partially encrypted request to a second one or more services.

13. The server computer system of claim 12, wherein the second one or more services
references the respective token with the indicator,
stores metadata associated with the partially encrypted request, and
provides the respective token to the first one or more services.

14. The server computer system of claim 13, wherein the first one or more services references the secure data with the respective token received from the
second one or more services,
validates the second API key;
populates the body with the secure data, and
transmits the second request according to a uniform resources locator (URL) mapped to the destination indicator.

15. The server computer system of claim 11, wherein the second API call is performed as a hypertext transfer protocol (HTTP) message with an HTTP method type selected based on the destination indicator.

16. A non-transitory computer readable storage medium storing instructions, which when executed by a computer processing system, causes the computer processing system to perform operations comprising:
storing, in a database, a plurality of secure data, wherein each of the plurality of secure data is associated with a respective token;
receiving from a first server, over a network, a request through a first application programming (API) call, the request comprising at least: an indicator associated with a secure data, a destination indicator, a first API key, a second API key, and a body having a predefined data format;
validating the request based on the first API key;
referencing the database to obtain the secure data based on the indicator and the respective token;
populating the body with the secure data; and
transmitting, over the network, a second request comprising the second API key and the populated body to a second server that is associated with the destination indicator, through a second API call.

17. The non-transitory computer readable storage medium of claim 16, wherein a first one or more services of the computer processing system
receives the request,
validates the request with the first API key,
encrypts the second API key, and
provides a resulting partially encrypted request to a second one or more services.

18. The non-transitory computer readable storage medium of claim 17, wherein the second one or more services of the computer processing system
references the respective token with the indicator,
stores metadata associated with the partially encrypted request, and
provides the respective token to the first one or more services.

19. The non-transitory computer readable storage medium of claim 18, wherein the first one or more services
references the secure data with the respective token received from the second one or more services,
validates the second API key,
populates the body with the secure data, and
transmits the second request according to a uniform resources locator (URL) mapped to the destination indicator.

20. The non-transitory computer readable storage medium of claim 16, wherein the second API call is performed as a hypertext transfer protocol (HTTP) message with an HTTP method type selected based on the destination indicator.

* * * * *